No. 758,102. Patented April 26, 1904.

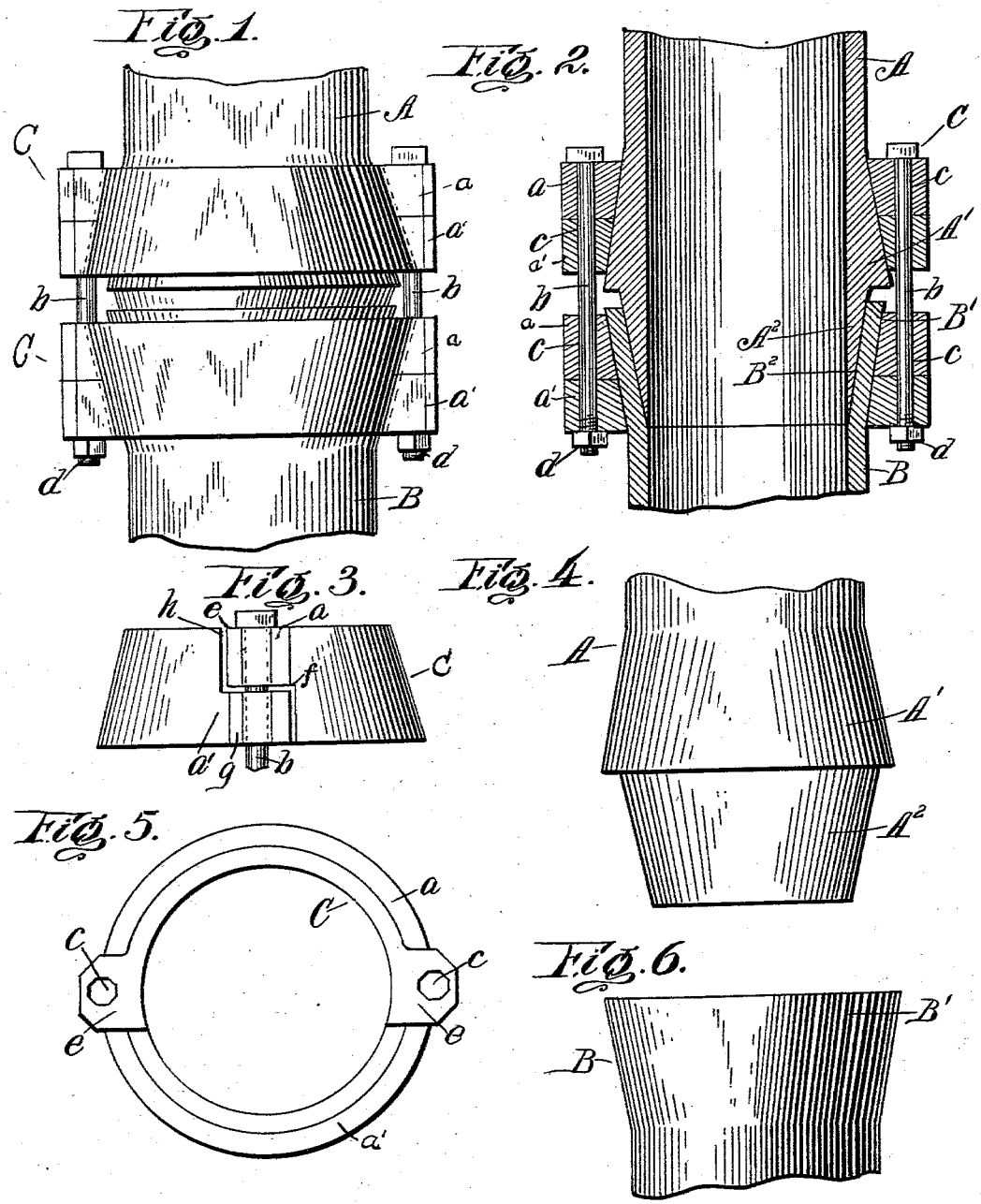

UNITED STATES PATENT OFFICE.

SAMUEL H. POWERS, OF ST. JOSEPH, MISSOURI.

PIPE-COUPLING.

SPECIFICATION forming part of Letters Patent No. 758,102, dated April 26, 1904.

Application filed March 28, 1903. Serial No. 149,920½. (No model.)

*To all whom it may concern:*

Be it known that I, SAMUEL H. POWERS, a citizen of the United States, residing at St. Joseph, in the county of Buchanan and State of Missouri, have invented certain new and useful Improvements in Pipe-Couplings, of which the following is a specification.

My invention relates to pipe-couplings, and more particularly to that class known as "detachable" pipe-couplings.

The object of my invention is to produce a device of this character which shall combine strength of construction with simplicity of parts.

Referring now to the drawings, Figure 1 is a side elevation of the adjoining ends of two pipes fitted with my coupling. Fig. 2 is a vertical section. Fig. 3 is side elevation of one of the collars removed from the pipe-section. Fig. 4 is a side elevation of the male pipe member. Fig. 5 is a plan view of the collar shown in Fig. 3. Fig. 6 is a side elevation of the female pipe member.

A indicates the male pipe member, provided with a bore of uniform diameter and having its end conically tapered, as at $A^2$. It is further provided with a flaring portion $A'$, forming a conical enlargement on the exterior of the pipe a short distance above the end.

B indicates the female pipe member, which has the extremity of its walls flared outwardly, forming a conical enlargement $B^2$ of the bore for the reception of the tapered end of the male pipe member and a conically-flaring exterior portion $B'$, similar to the conical enlargement upon the male member.

Surrounding each enlargement is a sectional collar C, formed in two sections $a\ a'$. The collars are provided with conical bores corresponding in inclination to the conical enlargements of the members, but of such diameter as to be securely retained thereon by the action of bolts $b\ b$, which pass through and connect the collars to each other. As clearly illustrated in Figs. 3 and 5, section $a$ is provided with two rectangular tongues $e\ e$ continuous with its upper face and cut-away portions $f$, and section $a'$ is provided with two corresponding tongues $g$, continuous with its lower face, and cut-away portions $h$, adapted to receive the tongues of the other section. Tongues $e\ g$ are laterally extended, forming lugs having apertures $c$, through which pass the bolts $b$, secured in place by nuts $d$.

In assembling the parts of my coupling the adjoining ends of the pipe-sections are first fitted together, then the sections of the collars are put in place around the conical enlargements, and bolts $b$ are passed through the registering apertures and secured by their nuts $d$.

From the foregoing description it will be appreciated that my invention combines in a high degree the essential qualities of strength, efficiency, and simplicity. Frictional sliding contact is employed throughout the coupling, and by wedging the members together it affords a water-tight and strong joint. It will be observed that the tapered end of the male pipe member slides frictionally within the seat in the female member, one collar rides frictionally upon the conical enlargement of the male member, while the other collar operates similarly upon the flaring end of the female member. While this sliding action effects a most efficient joint, it is productive within the pipe members of considerable lateral strain. Against this lateral strain the joint is doubly reinforced. The conical enlargement of the male member, which is subject to a large part of the stress, is so formed with reference to the pipe-walls as to produce a double thickness of metal at this point, and, further, the tapered end of the male member forms, with the flaring portion of the female member, a double thickness to resist the strain of the second collar. In this connection it should be noted that the end of the male member extends a sufficient distance within the female member to be directly beneath the collar.

While my coupling is intended for use in pipes of all materials, it is particularly adapted for cast-iron soil-pipes.

What I claim as new is—

1. In a device of the character described, a female pipe member having the extremity of its walls inclined outwardly forming a conically-flaring seat and a conically-flaring exterior portion, and a male pipe member having a bore of uniform diameter, said member being provided with an integral, conically-tapered end adapted to slide frictionally within the seat of the female member, forming a double thickness of metal therewith, said male member being further provided with a conically-flaring portion adjacent said end and integral with the wall of the member, forming a double thickness of metal therewith; combined with a collar surrounding the flaring portion of the male member and riding frictionally thereon, a second collar surrounding the double thickness formed by the flaring portion of the female member and the tapered end of the male member and riding frictionally thereon, and means for securing said collars together.

2. In a device of the character described, a female pipe member having the extremity of its walls inclined outwardly forming a conically-flaring seat and a conically-flaring exterior portion, and a male pipe member having a bore of uniform diameter, said member being provided with an integral, conically-tapered end adapted to slide frictionally within the seat of the female member, forming a double thickness of metal therewith, said male member being further provided with a conically-flaring portion adjacent said end and integral with the wall of the member, forming a double thickness of metal therewith; combined with a collar of conical bore surrounding the flaring portion of the male member and riding frictionally thereon, a second collar of conical bore surrounding the double thickness formed by the flaring portion of the female member and the tapered end of the male member and riding frictionally thereon, and bolts connecting said collars together.

In testimony whereof I hereto affix my signature in presence of two witnesses.

SAMUEL H. POWERS.

Witnesses:
L. D. RANSOM,
J. I. REDDING.